June 28, 1966     W. E. PONEMON ETAL     3,258,379
METHOD OF MAKING RESIN BONDED, FILAMENT WOUND ARTICLES
Filed June 26, 1961
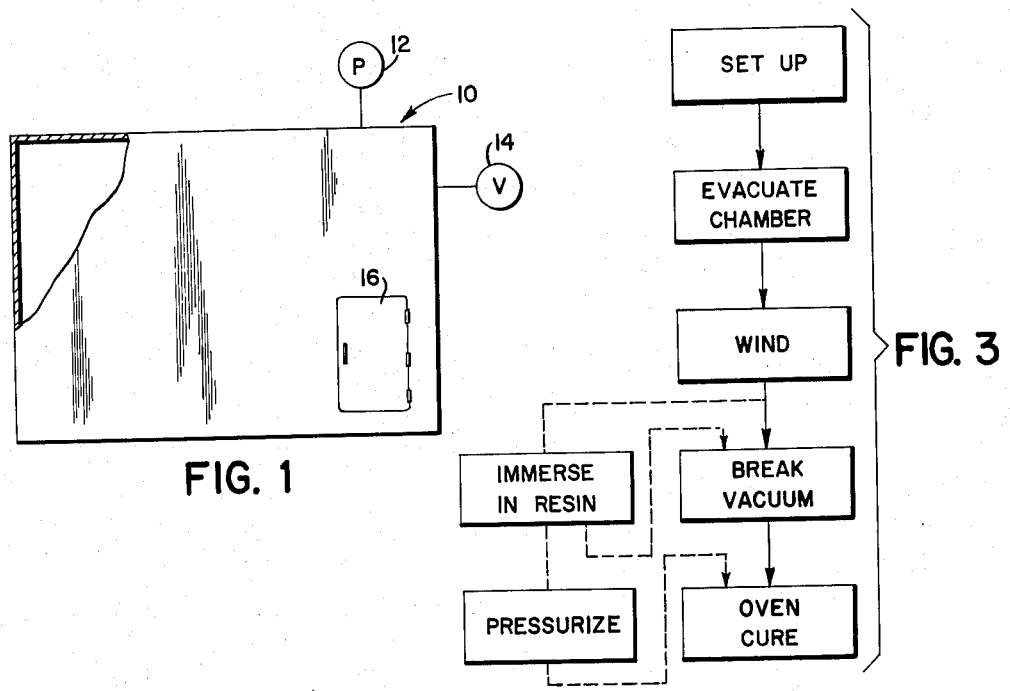
FIG. 1
FIG. 3
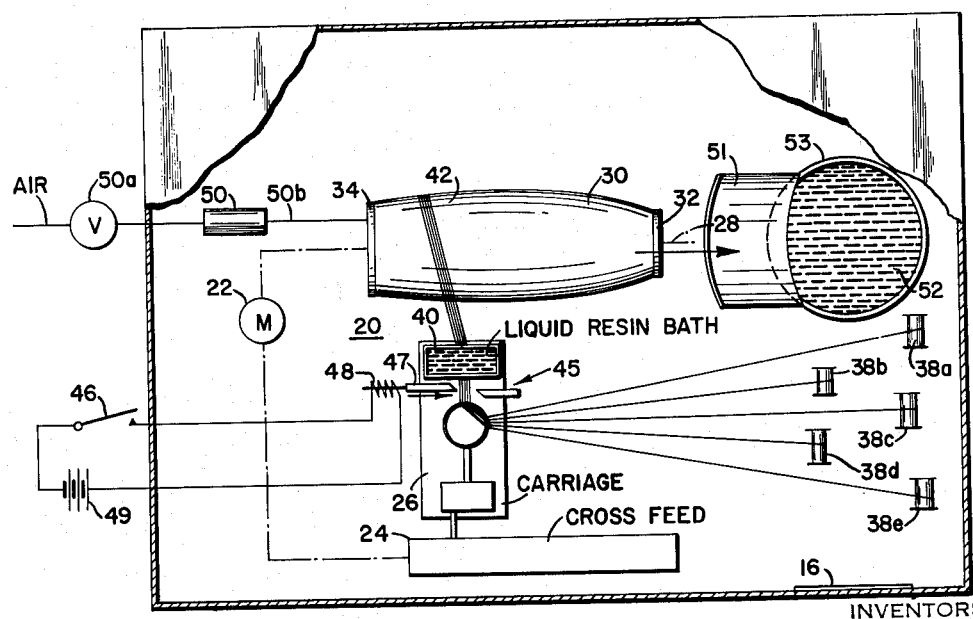
FIG. 2
INVENTORS
WARREN E. PONEMON
JONAS MEDNEY
BY Leonard H. King
ATTORNEY 3,258,379
METHOD OF MAKING RESIN BONDED, FILAMENT WOUND ARTICLES
Warren E. Ponemon, Syosset, and Jonas Medney, Oceanside, N.Y., assignors to Koppers Company, Inc., a corporation of Delaware
Filed June 26, 1961, Ser. No. 119,634
7 Claims. (Cl. 156—175)

This invention relates to containers and to a method and apparatus for making containers comprising a void-free, filament-wound, resin impregnated structure.

Filament-wound containers have been employed in recent years for a variety of applications. For example, hydraulic operating pressures for aircraft have been steadily increasing over recent years, and steel containers large enough to store the required volume may be unacceptably heavy. Further, all metal containers are costly of fabrication and test and are inherently dangerous because of fragmentation if a burst occurs.

On the other hand, air pressure containers comprising a resin impregnated glass fibre envelope are well received, the advantage of glass fibre being its lightness, comparative cheapness and very high tensile strength. The glass fibre is impregnated with resin and wound uniformly around the major diameter of the shell until a layer of predetermined thickness has been built up. The wound resin bonded fibre is then cured to provide a hard, light envelope having a very high tensile strength. The shell is provided with one or more pressure connections which project through the envelope.

In brief, the container is made by winding a structure over a supporting mandrel. Such a mandrel may be a thin metal shell, preferably corrugated metal, which forms a permanent part of the finished article or may be removable as, for example, a core of foundry sand, or an air inflated rubber bag.

The mandrel is rotated while bundles of fibres are laid down to form an envelope. The fibres are tensioned before winding and are run through a bath of liquid resin, so that the envelope, when wound, is impregnated with the resin which can subsequently be cured.

However, it has been found that employing conventional techniques, the resulting envelope tends to be porous. While a certain degree of porosity may at times be tolerated, many such containers do not meet standards and are rejected, adding greatly to the unit cost of satisfactory production. A porous structure has several characteristic defects such as being subject to gas leakage, and being subject to absorption of water vapor, both of which results in a sharp reduction in fibre strength.

It has been discovered that if the winding operation is carried out in a vacuum, then the resulting product is not porous, permitting the use of much thinner envelopes than heretofore believed practical and further, greatly reducing the proportion of rejects resulting in a given production run. Ancillary advantages include better wetting of the glass by the resin and thus better bonding of resin to glass.

Accordingly, it is an object of this invention to provide a process for making improved filament-wound resin impregnated structures.

Another object of the invention is the provision of a method for making improved filament-wound resin impregnated pressure vessels.

Still another object of this invention is to provide a method of making non-porous resin impregnated filament-wound fibre glass structures.

Still other objects and advantages of the present invention will, in part, be pointed out with particularity and will, in part, become obvious as the following description proceeds, taken in conjunction with the accompanying drawings.

In the drawings:
FIG. 1 shows in elevation a typical vacuum chamber.
FIG. 2 is a top view of the chamber with the roof partially broken away to expose the winding mechanism.
FIG. 3 is a flow chart showing the principle of the invention.

Referring now to FIG. 1, there is shown an airtight structure 10 provided with a vacuum pump 12 and a valve means 14. A door 16 provides entry into the structure 10. The door is provided with airtight sealing means. Methods of making such airtight tanks and sealable doors are well known to the art and need not be described in any greater detail herein.

Referring now to FIG. 2, there is shown a filament winding machine 20 driven by motor 22. Coupled to motor 22 there is provided a cross feed 24 upon which is mounted the carriage 26. As the spindle 28 rotates, there is rotated therewith a suitable mandrel 30 and a pair of fittings 32 and 34. Fittings 32 and 34 are employed to couple the completed container to a utilization apparatus. It will be appreciated that for some applications only one such fitting will be required, and that the use of such fittings does not form a part of the present invention.

As the mandrel 30 is rotated, there is fed thereon a plurality of fibres supplied from spools 38, 38a, etc. For example, a plurality of glass monofilaments, as many as 204, each 0.00038" in diameter, may be wound together. The fibres are tensioned before winding and are run through a bath of liquid resin 40 so that the envelope 42, when wound, is impregnated with the resin. The winding is continued with the carriage 26 traveling to and fro along feed 24 in synchronism with the rotation of the mandrel until a desired thickness is developed at which point the operation is discontinued.

Before the winding operation actually begins, the air is evacuated from the container until a vacuum corresponding to 7 mm. of mercury at 68°, or better, is obtained. After the winding is complete, the resin is permitted to set for about five minutes at which time remotely controlled cutting means 45, such as solenoid, or pneumatic cylinder actuated guillotine blade 47 is used to sever fibers from the wound structure. Switch 46 closes the circuit from power source 49 to solenoid 48.

Air cylinder 50, which is externally controlled by valve 50a, actuates piston 50b to eject the mandrel onto slide 51 and into a drum 53 containing sufficient liquid epoxy resin 52 to completely immerse the winding. This step serves to completely fill any voids existing between windings. Once the winding is immersed, the vacuum may be broken by means of valve 14 and the atmosphere admitted.

The drum 53 is then moved to an autoclave and the interior pressurized to at least 30 p.s.i., and preferably 200 p.s.i., after which the pressure is released and the article removed from the resin, drained and oven cured. As shown in the flow chart, the steps of immersion of the article in the resin while under the vacuum and the pressurization steps are optional and intended for producing devices where complete impregnation and freedom from voids is a requisite. In some instances, the step of immersing the article in the resin while under vacuum will provide sufficient impregnation. For other less critical applications, even this step may be eliminated.

The operator then enters the structure 10 through door 16 and removes the completed filament-wound article 42. The operator then mounts a new mandrel in the winding machine, places the glass fibre strands in connection with the mandrel, and leaves the chamber locking the door behind him. The pump 12 is started once again to exhaust the interior of chamber 10. The cycle is now repeated.

While a typical winding machine is shown by way of example, still other devices may be employed without departing from the spirit of the invention. The mandrel may be a simple steel tube or rod, if the article being produced is a tube; or, if the article is spherically shaped such as a conventional pressure vessel, then a rubber or sand mandrel is employed. For special applications, a shaped corrugated metal shell is employed as the mandrel.

By way of example, and without intending to be limiting, a suitable resin is a low viscosity epoxy resin, such as a glycidyl ether bisphenol-epichlorohydrin with an epoxide equivalent of 175–190. (Epoxide equivalent is expressed as grams of resin containing one gram—equivalent of epoxide.) The invention is applicable to still other resins.

Having thus disclosed the best embodiment of the invention presently contemplated; what is claimed is:

1. The process of forming a resin bonded filament wound article under conditions of vacuum comprising:
   (1) positioning the resin bonding and winding apparatus in a hermetically sealable container;
   (2) hermetically sealing the container;
   (3) evacuating the air from the container;
   (4) prewetting the filaments with a liquid resin;
   (5) completely winding the article within the container with filaments prewet with a liquid resin;
   (6) admitting the atmosphere to the container; and
   (7) curing the resin.

2. The process of claim 1 wherein the filament is glass fibre and the resin is an epoxy resin.

3. The process of forming resin bonded, filament-wound articles on a winding machine located in a hermetically sealable container comprising the steps of
   (1) engaging filament from a supply source to a mandrel positioned on the winding machine;
   (2) hermetically sealing the container;
   (3) evacuating the atmosphere from the container;
   (4) wetting the filament with a bonding resin;
   (5) winding the wetted filament over said mandrel;
   (6) severing the resultant winding from the filament supply source when the winding step is completed;
   (7) admitting the atmosphere to the container; and
   (8) curing the resin.

4. The process of claim 3 wherein said resin is an epoxy resin and said filament is glass fibre.

5. The process of forming resin bonded, filament-wound articles on a winding machine located in a hermetically sealable container comprising the steps of
   (1) engaging filament from a supply source to a mandrel positioned on the winding machine;
   (2) hermetically sealing the container;
   (3) evacuating the atmosphere from the container;
   (4) wetting the filament with a bonding resin;
   (5) winding the wetted filament over said mandrel;
   (6) severing the resultant winding from the filament supply source when the winding step is completed;
   (7) immersing the resultant winding in liquid resin contained in a tank;
   (8) removing the winding from said tank;
   (9) admitting the atmosphere to the container; and
   (10) curing the resin.

6. The process of forming resin bonded, filament-wound articles on a winding machine located in a hermetically sealable container comprising the steps of
   (1) engaging filament from a supply source to a mandrel positioned on the winding machine;
   (2) hermetically sealing the container;
   (3) evacuating the atmosphere from the container;
   (4) wetting the filament with a bonding resin;
   (5) winding the wetted filament over said mandrel;
   (6) severing the resultant winding from the filament supply source when the winding step is completed;
   (7) immersing the resultant winding in liquid resin;
   (8) pressurizing the said liquid resin;
   (9) removing said winding from said resin; and
   (10) curing the resin.

7. The process of claim 6 wherein the resin is an epoxy resin and the filament is glass fibre.

References Cited by the Examiner
UNITED STATES PATENTS

| | | |
|---|---|---|
| 1,595,487 | 8/1926 | Minton. |
| 2,629,894 | 3/1953 | Boggs _____ 156—173 |
| 2,749,266 | 6/1956 | Eldred _____ 156—173 |
| 2,837,456 | 3/1958 | Parilla _____ 156—173 |
| 2,924,264 | 2/1960 | Imhof _____ 154—2.6 |
| 2,936,516 | 5/1960 | Adair _____ 156—172 |
| 3,026,457 | 3/1962 | Ruscito _____ 156—189 XR |
| 3,067,803 | 12/1962 | Fleury _____ 156—382 |
| 3,112,234 | 11/1963 | Krupp _____ 156—173 |
| 3,114,665 | 12/1963 | Wiltshire _____ 156—173 |

EARL M. BERGERT, *Primary Examiner.*

ALEXANDER WYMAN, *Examiner.*

W. F. ZAGURSKI, R. J. CARLSON, P. DIER,
*Assistant Examiners.*